US012801747B2

(12) United States Patent
Wu et al.

(10) Patent No.: US 12,801,747 B2
(45) Date of Patent: Nov. 17, 2026

(54) DATA AUTHENTICATION DEVICE AND METHOD

(71) Applicant: Nuvoton Technology Corporation, Hsinchu Science Park (TW)

(72) Inventors: Ming-Hung Wu, Hsinchu Science Park (TW); Hao-Yang Chang, Hsinchu Science Park (TW); Chih-Hung Huang, Hsinchu Science Park (TW); Kang-Fu Chiu, Hsinchu Science Park (TW)

(73) Assignee: Nuvoton Technology Corporation, Hsinchu Science Park (TW)

( * ) Notice: Subject to any disclaimer, the term of this patent is extended or adjusted under 35 U.S.C. 154(b) by 294 days.

(21) Appl. No.: 18/654,386

(22) Filed: May 3, 2024

(65) Prior Publication Data

US 2024/0378295 A1 Nov. 14, 2024

(30) Foreign Application Priority Data

May 9, 2023 (TW) ................................ 112117076

(51) Int. Cl.
*G06F 8/654* (2018.01)
*G06F 9/445* (2018.01)
(Continued)

(52) U.S. Cl.
CPC ............ *G06F 21/572* (2013.01); *G06F 21/64* (2013.01); *G06F 8/65* (2013.01); *G06F 11/1417* (2013.01);
(Continued)

(58) Field of Classification Search
CPC ...... G06F 21/572; G06F 21/64; G06F 21/575; G06F 9/4401; G06F 21/79; G06F 21/554;
(Continued)

(56) References Cited

U.S. PATENT DOCUMENTS 10,853,179 B2 * 12/2020 Montero ............. G06F 11/1417
2007/0260790 A1 * 11/2007 Chen ......................... G06F 8/65
710/110

(Continued)

FOREIGN PATENT DOCUMENTS

CN 104317743 A * 1/2015 ............ G06F 12/14
CN 109804378 A 5/2019

(Continued)

OTHER PUBLICATIONS

An Office Action in corresponding TW Application No. 112117076 issued May 28, 2024 is attached, 10 pages.

(Continued)

*Primary Examiner* — Anibal Riveracruz
(74) *Attorney, Agent, or Firm* — MUNCY, GEISSLER, OLDS & LOWE, P.C.

(57) ABSTRACT

An embodiment of the invention provides a data authentication device. The data authentication device may include a main memory, a backup memory, a platform control hub (PCH) and an embedded controller (EC). The main memory may be configured to store data. The backup memory may be configured to back up the data stored in the main memory. The PCH is coupled to the main memory and generates a write command to write a first data image to the main memory, wherein the first data image comprises updated data and a digital signature. The EC is coupled to the main memory, the backup memory and the PCH and obtains the first data image from the PCH. When the EC detects a write command, the EC may perform an authentication for the updated data based on the first data image or a second data image corresponding to the first data image.

18 Claims, 7 Drawing Sheets

(51) Int. Cl.

| | |
|---|---|
| ***G06F 21/57*** | (2013.01) |
| ***G06F 21/64*** | (2013.01) |
| ***H04L 9/32*** | (2006.01) |
| *G06F 8/65* | (2018.01) |
| *G06F 11/14* | (2006.01) |
| *G06F 12/14* | (2006.01) |
| *G06F 21/55* | (2013.01) |
| *G06F 21/79* | (2013.01) |

(52) U.S. Cl.
CPC ........ *G06F 12/1425* (2013.01); *G06F 21/554* (2013.01); *G06F 21/79* (2013.01); *H04L 9/3247* (2013.01)

(58) Field of Classification Search
CPC .... G06F 12/1425; G06F 8/65; G06F 11/1417; H04L 9/3247
See application file for complete search history.

(56) References Cited

U.S. PATENT DOCUMENTS

| | | | | |
|---|---|---|---|---|
| 2013/0318357 | A1 | 11/2013 | Abraham et al. | |
| 2016/0063255 | A1* | 3/2016 | Jeansonne | G06F 21/575 713/2 |
| 2020/0004994 | A1* | 1/2020 | Hershman | G06F 21/85 |
| 2021/0034355 | A1* | 2/2021 | Montero | G06F 3/0652 |
| 2021/0216638 | A1 | 7/2021 | Park et al. | |
| 2023/0315913 | A1* | 10/2023 | Chandra | G06F 21/575 726/26 |

FOREIGN PATENT DOCUMENTS

| | | | |
|---|---|---|---|
| CN | 115129341 | A | 9/2022 |
| TW | 201506675 | A | 2/2015 |
| TW | 201843583 | A | 12/2018 |
| TW | 202008206 | A | 2/2020 |

OTHER PUBLICATIONS

OA corresponding to TW App. No. 11221234660, Jun. 12, 2023, 10 pages.

* cited by examiner

DATA AUTHENTICATION DEVICE AND METHOD

CROSS REFERENCE TO RELATED APPLICATIONS

This application claims priority of TW patent application No. 112117076 filed on May 9, 2023, the entirety of which is incorporated by reference herein.

BACKGROUND OF THE INVENTION

Field of the Invention

The invention generally relates to data authentication technology, and more particularly, to a data authentication technology for authenticating image data written by the platform controller hub (PCH) when the PCH is operating.

Description of the Related Art

Information security is an important concern for everyone in modern society. For example, the applications used in the Internet of Things (IoT), artificial intelligence (AI), and mobile payment systems all rely on information security to ensure customer trust. Specifically, information security measures are needed to prevent hacking and other forms of attack by people with bad intentions. The most common attack techniques may comprise the rewriting of the firmware image of the platform controller hub (PCH), e.g., the firmware image of the PCH may be rewritten as malware that is designed to steal proprietary and other private information.

In current protection mechanisms, when the system power is enabled, the embedded controller (EC) may authenticate the legality of the firmware image stored in the main memory. The EC may not allow the PCH to access the main memory (e.g., perform the operation of boot loader) until the authentication of the firmware has been successful.

However, the EC only protects the PCH when the system power is being enabled. Therefore, when the PCH starts to perform normal operations (i.e., the operation of boot loader has been performed), the EC cannot provide any additional protection for the read and write operations of the PCH.

Therefore, how to make sure that the EC can still assure authentication for the firmware written by the PCH after the PCH starts to perform normal operations is a topic worthy of discussion.

BRIEF SUMMARY OF THE INVENTION

A data authentication device and method are provided to overcome the problems mentioned above.

An embodiment of the invention provides a data authentication device. The data authentication device may comprise a main memory, a backup memory, a platform control hub (PCH) and an embedded controller (EC). The main memory may be configured to store data. The backup memory may be configured to back up the data stored in the main memory. The PCH is coupled to the main memory and generates a write command to write a first data image to the main memory, wherein the first data image comprises updated data and a digital signature. The EC is coupled to the main memory, the backup memory and the PCH and obtains the first data image from the PCH. When the EC detects a write command, the EC may perform an authentication for the updated data based on the first data image or a second data image corresponding to the first data image.

In an embodiment, the EC may comprise a memory circuit, an address checking circuit, an address allocation circuit and an authentication circuit. The address checking circuit is coupled to the main memory. The address checking circuit may detect the write command, obtain the first data image from the PCH, and determine that the first data image is written in all address spaces of the main memory or part of address spaces of the main memory. The address allocation circuit is coupled to the memory circuit, the address checking circuit and the backup memory, and generates the second data image. The authentication circuit is coupled to the address allocation circuit, and performs the authentication for the first data image or the second data image.

In an embodiment, when the address checking circuit determines that the first data image is written in all address spaces of the main memory, the authentication circuit may decrypt the digital signature to obtain a first hash value, and use a hash algorithm to generate a second hash value based on the updated data. Then, the authentication circuit may compare the first hash value to the second hash value to authenticate the updated data.

In an embodiment, when the address checking circuit determines that the first data image is written in part of address spaces of the main memory, the address checking circuit may transmit first address information to the address allocation circuit and transmit the first data image and the second address information to the memory circuit. The first address information may correspond to the mapping relationship of the main memory and the memory circuit, and the second address information may correspond to the memory circuit. The address allocation circuit may obtain stored data corresponding to the first data image and the second address information from the memory circuit and obtain the backup data from the backup memory. The address allocation circuit may generate the second data image based on the stored data, the first address information and the backup data, and transmit the second data image to the authentication circuit. The authentication circuit may decrypt the digital signature of the second data image to obtain a first hash value, and use a hash algorithm to generate a second hash value based on data of the second data image. The authentication circuit may compare the first hash value to the second hash value to authenticate the data of the second data image.

In an embodiment, when the address checking circuit determines that the first data image is written in part of address spaces of the main memory, the address checking circuit may transmit the first data image and the first address information to the address allocation circuit. The first address information corresponds to the mapping relationship of the main memory and the memory circuit. The address allocation circuit may obtain the backup data from the backup memory, and based on the first data image, the first address information and the backup data, transmit the second address information and adjustment data which corresponds to the first data image, the first address information, and the backup data to the memory circuit. The memory circuit may transmit the second data image to the authentication circuit based on the adjustment data and the second address information. The second address information corresponds to the memory circuit. The authentication circuit may decrypt the digital signature of the second data image to obtain a first hash value, and use a hash algorithm to generate a second hash value based on data of the second data image. The authentication circuit may compare the first hash value to the second hash value to authenticate the data of the second data image.

In an embodiment, when the updated data does not pass the authentication, the EC may recover the main memory based on the backup data stored in the backup memory.

An embodiment of the invention provides a data authentication method. The data authentication method may be applied to a data authentication device. The data authentication method may comprise the following steps. The embedded controller (EC) of the data authentication device may detect whether the platform control hub (PCH) of the data authentication device generates a write command to write the first data image to the main memory. When the EC detects that the PCH has generated the write command, the EC may obtain the first data image from the PCH, wherein the first data image comprises updated data and a digital signature. Then, the EC may perform an authentication for the updated data based on the first data image or a second data image corresponding to the first data image.

Other aspects and features of the invention will become apparent to those with ordinary skill in the art upon review of the following descriptions of specific embodiments of a data authentication device and method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
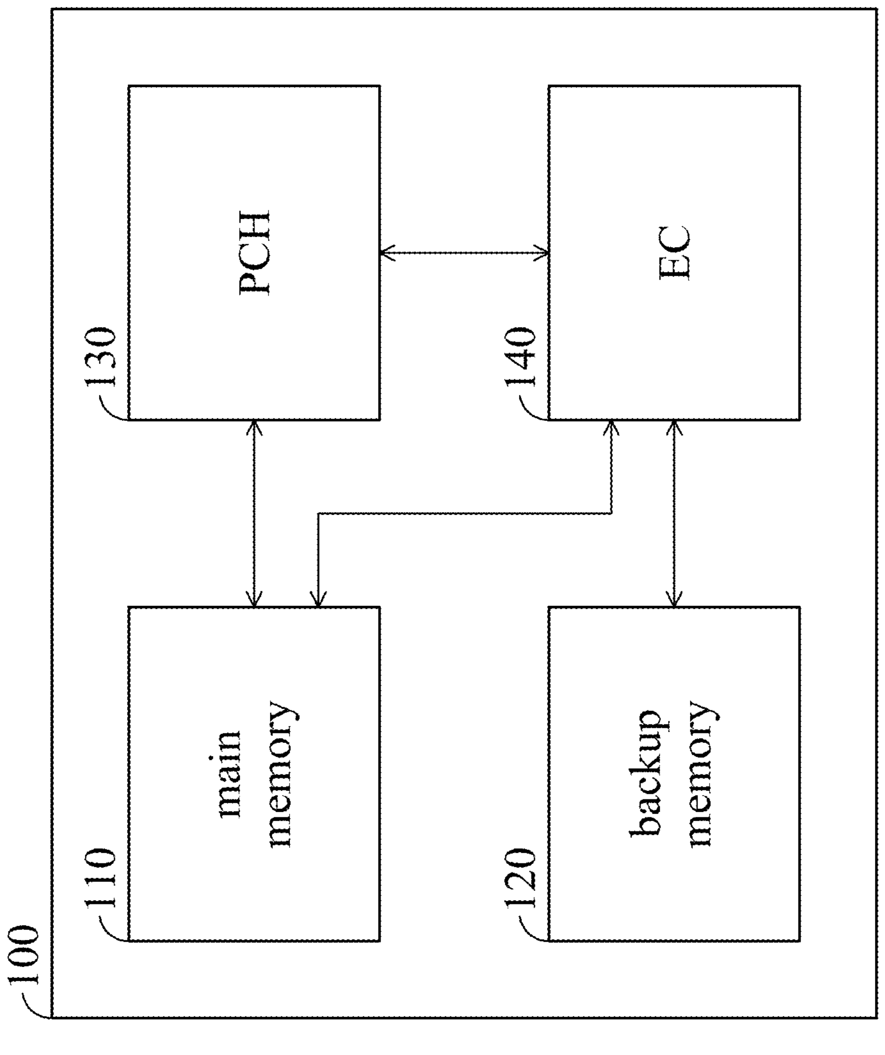
FIG. 1 is a block diagram of a data authentication device 100 according to an embodiment of the invention.

FIG. 1 is a block diagram of a data authentication device 100 according to an embodiment of the invention. As shown in FIG. 1, the data authentication device 100 may comprise a main memory 110, a backup memory 120, a platform controller hub (PCH) 130 and an embedded controller (EC) 140. It should be noted that FIG. 1 presents a simplified block diagram in which only the elements relevant to the invention are shown. However, the invention should not be limited to what is shown in FIG. 1. The data authentication device 100 may also comprise other elements.

According to the embodiments of the invention, the data authentication device 100 may be applied to the integrated circuit (IC) of microcontroller (MCU), but the invention should not be limited thereto.

According to the embodiments of the invention, the main memory 110 and the backup memory 120 may be flash memories. The main memory 110 may be connected to the PCH 130 and EC 140 through a serial peripheral interface bus (SPI). The backup memory 120 may be also connected to the EC 140 through the SPI. The main memory 110 may be configured to store the data image, e.g., firmware image. The backup memory 120 may be configured to back up the data stored in the main memory 110.

According to the embodiments of the invention, the PCH 130 may be configured to update the data image stored in the main memory 110. When the PCH 130 writes new data image (e.g., updated firmware image) into the main memory 110, the PCH 130 may generate a write command to write the updated data image into the main memory 110.

According to the embodiments of the invention, the EC 140 may be configured to authenticate whether the data image needed to be written into the main memory 110 by the PCH 130 is legal. Details for the operations of EC 140 may be discussed below.

Figure 2:
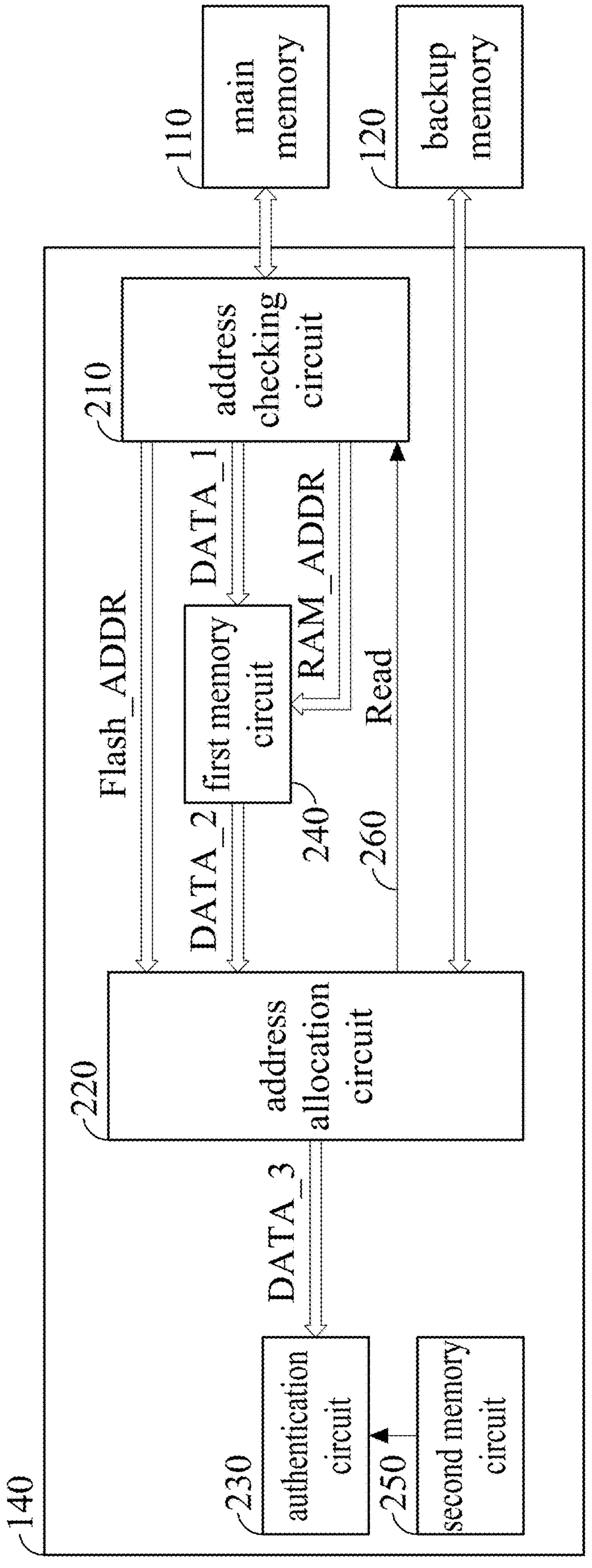
FIG. 2 is a schematic diagram illustrating the EC 140 according to an embodiment of the invention.

FIG. 2 is a schematic diagram illustrating the EC 140 according to an embodiment of the invention. As shown in FIG. 2, the EC 140 may comprise an address checking circuit 210, an address allocation circuit 220, an authentication circuit 230, a first memory circuit 240, and a second memory circuit 250.

According to an embodiment of the invention, the address checking circuit 210 may communicate with the main memory 110 through the SPI, and the address allocation circuit 220 may communicate with the backup memory 120 through the SPI.

According to an embodiment of the invention, the first memory circuit 240 may be a random access memory (RAM), and the second memory circuit 250 may be a read only memory (ROM). The second memory circuit 250 may store the related data for authentication performed by the authentication circuit 230, e.g., a public key and the related codes for performing the authentication. The authentication circuit 230 may perform the authentication based on the data stored in the second memory circuit 250.

The address checking circuit 210 may detect whether the PCH 130 generates a write command. When the address checking circuit 210 detects a write command which has been generated by the PCH 130, the address checking circuit 210 may determine that the data image DATA_1 written into the main memory 110 by the PCH 130 is written into all address spaces of the main memory 110 or part of address spaces of the main memory 110. The data image DATA_1 written into the main memory 110 by the PCH 130 may comprise updated data and a digital signature, and the digital signature may be encrypted based on the updated data.

When the address checking circuit 210 determines that the data image DATA_1 written into the main memory 110 by the PCH 130 is written into all address spaces of the main memory 110, the authentication circuit 230 may use the public key stored in the second memory circuit 250 to decrypt the digital signature in the data image DATA_1 to obtain a first hash value (i.e., Digest 1). In addition, the authentication circuit 230 may use a hash algorithm (e.g., Secure Hash Algorithm (SHA)) to calculate the updated data in the data image DATA_1 to generate a second hash value (i.e., Digest 2). Then, the authentication circuit 230 may authenticate the updated data in the data image DATA_1 by determining whether the first hah value and the second hash value are the same.

If the authentication of the updated data is successful, the address checking circuit 210 may continuously detect whether the PCH 130 generates a new write command. If the authentication of the updated data is fail, the authentication circuit 230 may transmit a RESET signal to suspend the PCH 130 accessing the data of main memory 110, and recover the main memory 110 based on the backup data stored in the backup memory 120. That is, the authentication circuit 230 may use the backup data stored in the backup memory 120 to cover the data stored in the main memory 110. After the main memory is recovered, the authentication circuit 230 may release the limitation of the RESET signal for the PCH 130.

When the address checking circuit 210 determines that the data image DATA_1 written into the main memory 110 by the PCH 130 is written into part of address spaces of the main memory 110, the address checking circuit 210 may transmit the first address information Flash_ADDR to the address allocation circuit 220, and transmit the second address information RAM_ADDR and the data image DATA_1 written into the main memory 110 to the first memory circuit 240.

In the embodiment of FIG. 2, the first address information Flash_ADDR may comprise a mapping relationship corresponded to or associated with the main memory 110 and the first memory circuit 240. Based on the first address information Flash_ADDR, the address allocation circuit 220 may know the relationship between the address which the main memory 110 is used to store the data image DATA_1 and the address which the first memory circuit 240 is used to store the data image DATA_1.

In the embodiment of FIG. 2, the second address information RAM_ADDR may comprise the address information of the data image DATA_1 stored into the first memory circuit 240. Based on the second address information RAM_ADDR, the first memory circuit 240 may store the data image DATA_1 in the address which is indicated in the second address information RAM_ADDR. In addition, the first memory circuit 240 may output the stored data DATA_2 corresponded to the data image DATA_1 and the second address information RAM_ADDR to the address allocation circuit 220. The address allocation circuit 220 may use a read control line 260 to control the address checking circuit 210 accessing the first memory circuit 240. That is, when the address checking circuit 210 receives a control signal Read from the read control line 260, the address checking circuit 210 may generate the second address information RAM_ADDR.

The address allocation circuit 220 may obtain the stored data DATA_2 corresponded to the data image DATA_1 and the second address information RAM_ADDR from the first memory circuit 240, and obtain the backup data from the backup memory 120. Then, the address allocation circuit 220 may generate the reconstructed data image DATA_3 based on the stored data DATA_2, first address information Flash_ADDR and the backup data, and transmit the reconstructed data image DATA_3 to the authentication circuit 230.

Taking Table 1~Table 4 as an example, the data image DATA_1 may comprise the contents shown in Table 1. The stored data DATA_2 may comprise the contents shown in Table 2. The backup data may comprise the contents shown in Table 3. The reconstructed data image DATA_3 may comprise the contents shown in Table 4. Accordingly, based on the first address information Flash_ADDR, the contents of the stored data DATA_2, and the contents of the backup data, the address allocation circuit 220 may generate the contents of the reconstructed data image DATA_3 in the access order. That is, based on the first address information Flash_ADDR, the contents of the stored data DATA_2, and the contents of the backup data, the address allocation circuit 220 may reconstruct the data currently stored in the main memory.

TABLE 1

| main memory address | DATA_1 |
|---|---|
| 1 | abc |
| 3 | def |
| 5 | ghi |

TABLE 2

| First memory address | DATA_2 |
|---|---|
| 50 | abc |
| 51 | def |
| 52 | ghi |

TABLE 3

| backup memory address | backup data | Time | Oeder | DATA_3 |
|---|---|---|---|---|
| 0 | aaa | T1 | backup memory address 0 | aaa |
| 1 | bbb | T2 | first memory address 50 | abc |
| 2 | ccc | T3 | backup memory address 2 | ccc |
| 3 | ddd | T4 | first memory address 51 | def |
| 4 | eee | T5 | backup memory address 4 | eee |
| 5 | fff | T6 | first memory address 52 | ghi |
| 6 | ggg | T7 | backup memory address 6 | ggg |
| 7 | hhh | T8 | backup memory address 7 | hhh |

After the authentication circuit 230 obtains the reconstructed data image DATA_3, the authentication circuit 230 may use the public key stored in the second memory circuit 250 to decrypt the digital signature of the reconstructed data image DATA_3 (the digital signature is the same as the digital signature in the data image DATA_1) to obtain a first hash value. Then, the authentication circuit 230 may use a hash algorithm to generate a second hash value based on the adjusted updated data in the reconstructed data image DATA_3. Then, the authentication circuit 230 may compare the first hash value to the second hash value to determine whether the first hash value is the same as the second hash value to authenticate the adjusted updated data in the reconstructed data image DATA_3.

If the authentication of the adjusted updated data is successful, the address checking circuit 210 may continuously detect whether the PCH 130 generates a new write command. If the authentication of the adjusted updated data is fail, the authentication circuit 230 may transmit a RESET signal to suspend the PCH 130 accessing the data of main memory 110, and recover the main memory 110 based on the backup data stored in the backup memory 120. That is, the authentication circuit 230 may use the backup data stored in the backup memory 120 to cover the data stored in the main memory 110. After the main memory is recovered, the authentication circuit 230 may release the limitation of the RESET signal for the PCH 130.

Figure 3:
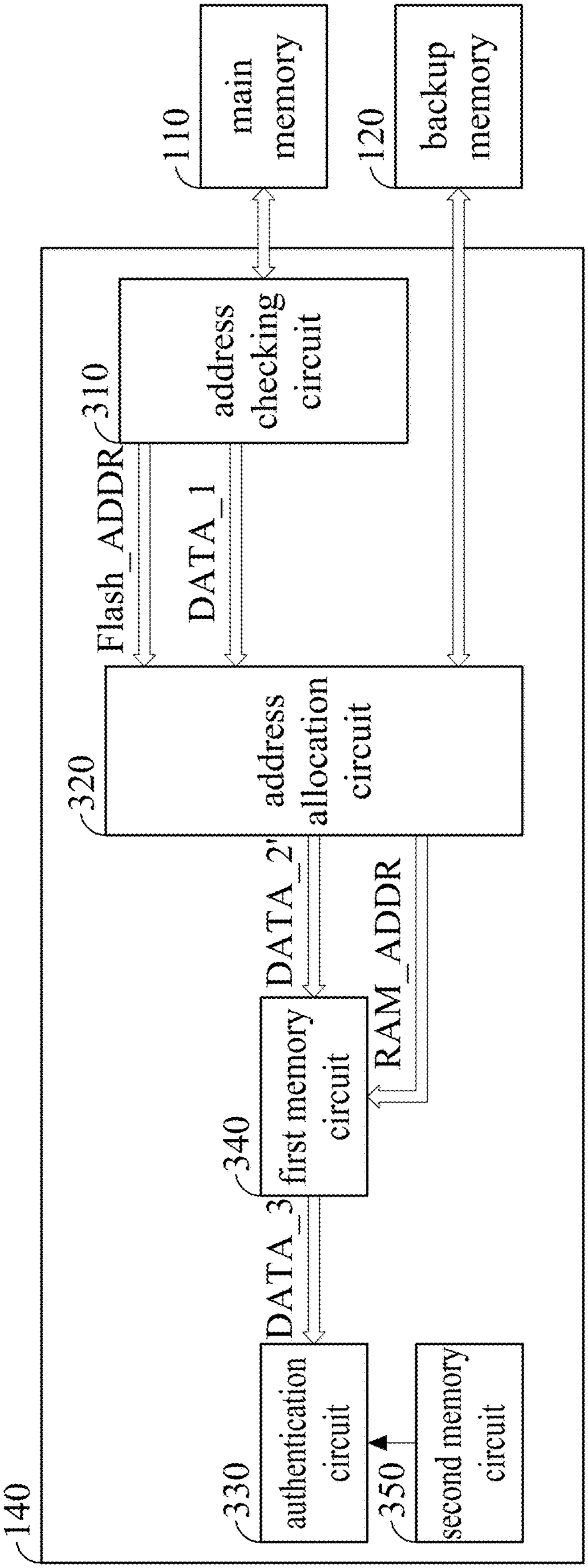
FIG. 3 is a schematic diagram illustrating the EC 140 according to another embodiment of the invention.

FIG. 3 is a schematic diagram illustrating the EC 140 according to another embodiment of the invention. As shown in FIG. 3, the EC 140 may comprise an address checking circuit 310, an address allocation circuit 320, an authentication circuit 330, a first memory circuit 340, and a second memory circuit 350.

According to an embodiment of the invention, the address checking circuit 310 may communicate with the main memory 110 through the SPI, and the address allocation circuit 320 may communicate with the backup memory 120 through the SPI.

According to an embodiment of the invention, the first memory circuit 340 may be a random access memory (RAM), and the second memory circuit 350 may be a read only memory (ROM). The second memory circuit 350 may store the related data for authentication performed by the authentication circuit 330, e.g., a public key and the related codes for performing the authentication. The authentication circuit 330 may perform the authentication based on the data stored in the second memory circuit 350.

The address checking circuit 310 may detect whether the PCH 130 generates a write command. When the address checking circuit 310 detects a write command which has been generated by the PCH 130, the address checking circuit 310 may determine that the data image DATA_1 written into the main memory 110 by the PCH 130 is written into all address spaces of the main memory 110 or part of address spaces of the main memory 110. The data image DATA_1 written into the main memory 110 by the PCH 130 may comprise updated data and a digital signature, and the digital signature may be encrypted based on the updated data.

When the address checking circuit 310 determines that the data image DATA_1 written into the main memory 110 by the PCH 130 is written into all address spaces of the main memory 110, the operations of the authentication circuit 330 may be similar to the operations of the authentication circuit 230. Therefore, these contents will be not illustrated again.

When the address checking circuit 310 determines that the data image DATA_1 written into the main memory 110 by the PCH 130 is written into part of address spaces of the main memory 110, the address checking circuit 310 may transmit the first address information Flash_ADDR and the data image DATA_1 to the address allocation circuit 320.

In the embodiment of FIG. 3, the first address information Flash_ADDR may comprise a mapping relationship corresponded to or associated with the main memory 110 and the first memory circuit 340. Based on the first address information Flash_ADDR, the address allocation circuit 320 may know the relationship between the address which the main memory 110 is used to store the data image DATA_1 and the address which the first memory circuit 340 is used to store the data image DATA_1.

Based on the data image DATA_1, first address information Flash_ADDR, and the backup data which is stored in the backup memory 120, the address allocation circuit 320 may generate adjustment data DATA_2' corresponding to the data image DATA_1, first address information Flash_ADDR, and the backup data. Then, the address allocation circuit 320 may transmit the second address information RAM_ADDR and the adjustment data DATA_2' to the first memory circuit 340.

In the embodiment of FIG. 3, the second address information RAM_ADDR may comprise the address information of the adjustment data DATA_2' stored in the first memory circuit 340. Based on the second address information RAM_ADDR, the first memory circuit 340 may store the adjustment data DATA_2' in the address which is indicated in the second address information RAM_ADDR. In addition, the first memory circuit 340 may generate the reconstructed data image DATA_3 based on the second address information RAM_ADDR and the adjustment data DATA_2', and output the reconstructed data image DATA_3 to the authentication circuit 330.

Taking Tables 5~8 as an example, the data image DATA_1 may comprise the contents shown in Table 5. The adjustment data DATA_2' may comprise the contents shown in Table 6. The backup data may comprise the contents shown in Table 7. The reconstructed data image DATA_3 may comprise the contents shown in Table 8. The address allocation circuit 320 may generate the adjustment data DATA_2' based on the first address information Flash_ADDR, the data image DATA_1, and the backup data which is stored in the backup memory 120. That is, based on the first address information Flash_ADDR, the data image DATA_1, and the contents of the backup data stored in the backup memory 120, the address allocation circuit 320 may reconstruct the data currently stored in the main memory 110. Then, the first memory circuit 340 may generate the reconstructed data image DATA_3 based on the second address information RAM_ADDR and the adjustment data DATA_2'.

TABLE 5

| main memory address | DATA_1 |
|---|---|
| 1 | abc |
| 3 | def |
| 5 | ghi |

TABLE 6

| first memory address | order | DATA_2' | time |
|---|---|---|---|
| 51 | DATA_1 | abc | T1 |
| 53 | DATA_1 | def | T2 |
| 55 | DATA_1 | ghi | T3 |
| 50 | backup memory address 0 | aaa | T4 |
| 52 | backup memory address 2 | ccc | T5 |
| 54 | backup memory address 4 | eee | T6 |
| 56 | backup memory address 6 | ggg | T7 |
| 57 | backup memory address 7 | hhh | T8 |

TABLE 7

| backup memory address | backup data |
|---|---|
| 0 | aaa |
| 1 | bbb |
| 2 | ccc |
| 3 | ddd |
| 4 | eee |
| 5 | fff |
| 6 | ggg |
| 7 | hhh |

TABLE 8

| first memory address | backup data |
|---|---|
| 50 | aaa |
| 51 | bbb |
| 52 | ccc |
| 53 | ddd |
| 54 | eee |
| 55 | fff |

TABLE 8-continued

| first memory address | backup data |
|---|---|
| 56 | ggg |
| 57 | hhh |

After the authentication circuit 330 obtains the reconstructed data image DATA_3, the authentication circuit 330 may use the public key stored in the second memory circuit 350 to decrypt the digital signature of the reconstructed data image DATA_3 (the digital signature is the same as the digital signature in the data image DATA_1) to obtain a first hash value. Then, the authentication circuit 330 may use a hash algorithm to generate a second hash value based on the adjusted updated data in the reconstructed data image DATA_3. Then, the authentication circuit 330 may compare the first hash value to the second hash value to determine whether the first hash value is the same as the second hash value to authenticate the adjusted updated data in the reconstructed data image DATA_3.

If the authentication of the adjusted updated data is successful, the address checking circuit 310 may continuously detect whether the PCH 130 generates a new write command. If the authentication of the adjusted updated data is fail, the authentication circuit 330 may transmit a RESET signal to suspend the PCH 130 accessing the data of main memory 110, and recover the main memory 110 based on the backup data stored in the backup memory 120. That is, the authentication circuit 330 may use the backup data stored in the backup memory 120 to cover the data stored in the main memory 110. After the main memory is recovered, the authentication circuit 330 may release the limitation of the RESET signal for the PCH 130.

Figure 4:
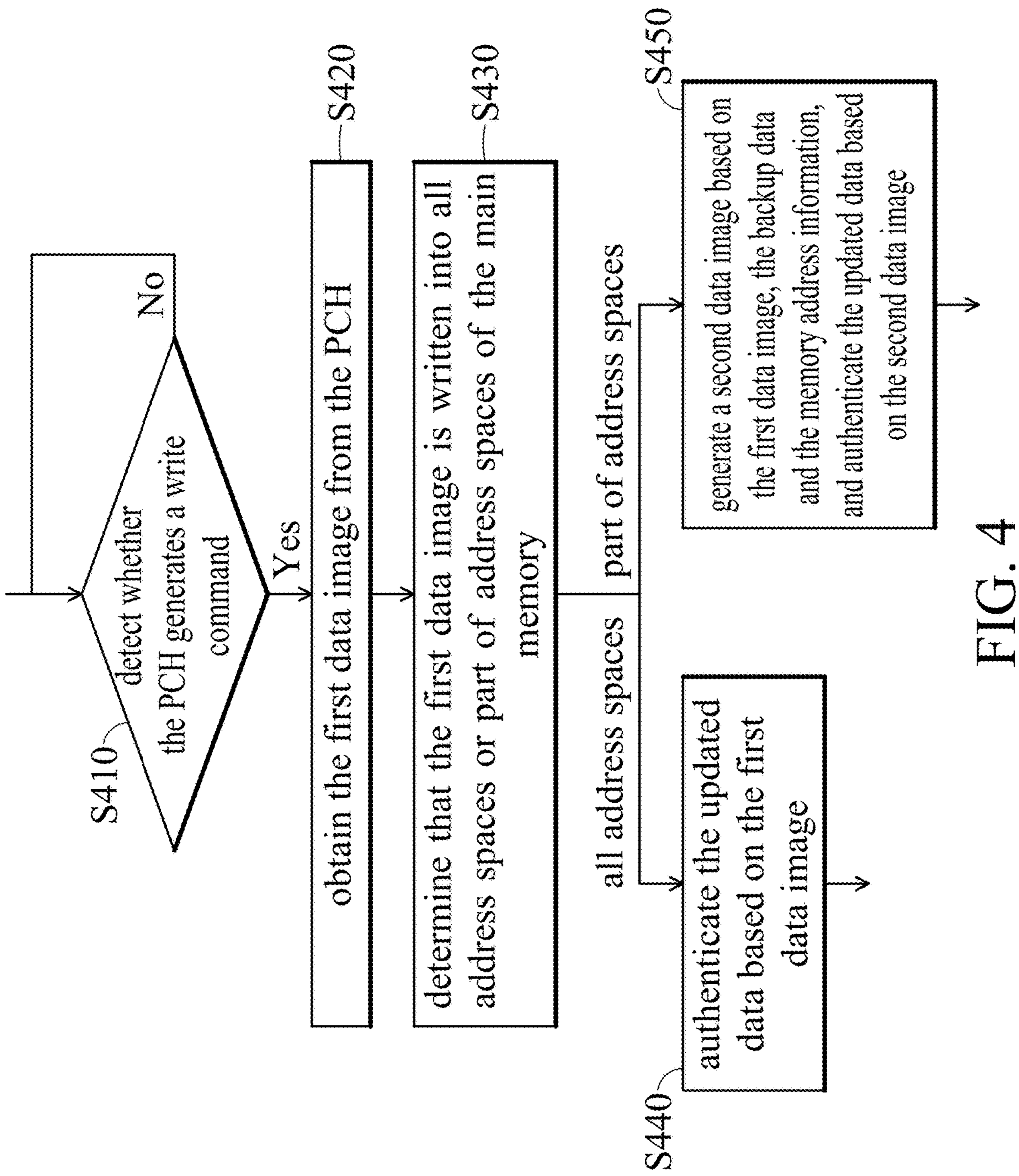
FIG. 4 is a flow chart illustrating a data authentication method according to an embodiment of the invention.

FIG. 4 is a flow chart illustrating a data authentication method according to an embodiment of the invention. The data authentication method shown in FIG. 4 can be applied to the data authentication device 100. It should be noted that the data authentication method is applied when the PCH 130 of the data authentication device 100 has started to perform normal operations. As shown in FIG. 4, in step S410, the EC 140 of the data authentication device 100 may detect whether the PCH 130 of the data authentication device 100 generates a write command.

When the PCH 130 of the data authentication device 100 generates the write command, step S420 is performed. In step S420, the EC 140 may obtain the first data image from the PCH 130. The first data image may comprise updated data and a digital signature.

In step S430, the EC 140 may determine that the first data image is written into all address spaces or part of address spaces of the main memory 110 of the data authentication device 100.

When the first data image is written into all address spaces of the main memory 110, step S440 is performed. In step S440, the EC 140 may authenticate the updated data based on the first data image.

When the first data image is written into part of address spaces of the main memory 110, step S450 is performed. In step S450, the EC 140 may generate a second data image based on the first data image, the backup data stored in the backup memory 120 of the data authentication device 100 and the memory address information, and authenticate the updated data based on the second data image.

Figure 5:
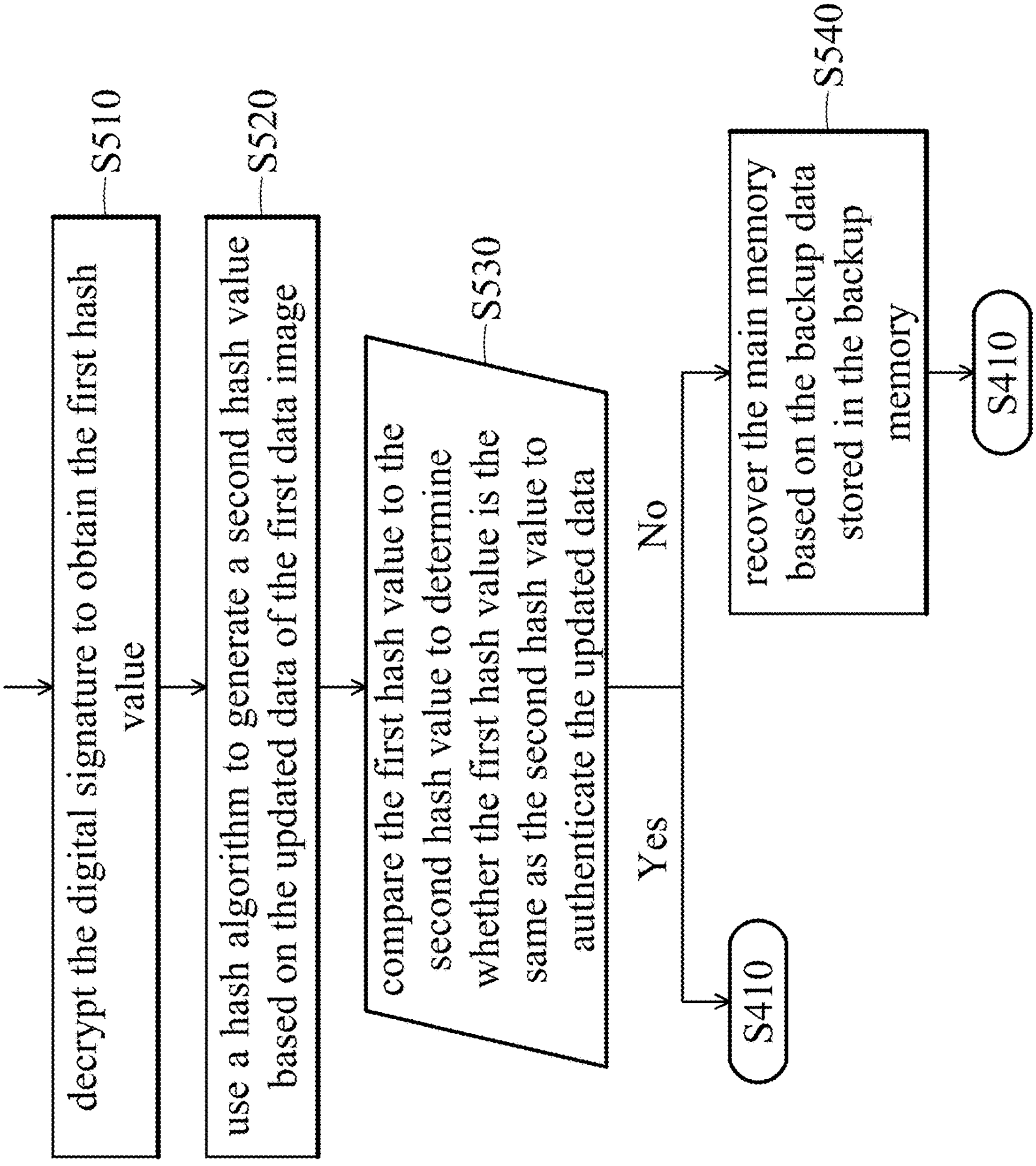
FIG. 5 is a flow chart illustrating step S440 according to an embodiment of the invention.

FIG. 5 is a flow chart illustrating step S440 according to an embodiment of the invention. The data authentication method shown in FIG. 5 can be applied to the data authentication device 100. In step S510, the authentication circuit of the EC 140 may decrypt the digital signature to obtain the first hash value.

In step S520, the authentication circuit may use a hash algorithm to generate a second hash value based on the updated data of the first data image.

In step S530, the authentication circuit may compare the first hash value to the second hash value to determine whether the first hash value is the same as the second hash value to authenticate the updated data.

If the first hash value and the second hash value are the same (i.e., the updated data passes the authentication (or the authentication for the updated data is successful)), the flow may back to step S410. The EC 140 may continuously detect whether the PCH 130 generates a new write command.

If the first hash value and the second hash value are not the same (i.e., the updated data does not pass the authentication (or the authentication for the updated data is fail), step S540 is performed. In step S540, the EC 140 may recover the main memory 110 based on the backup data stored in the backup memory 120. Then, the flow may back to S410. The EC 140 may continuously detect whether the PCH 130 generates a new write command.

Figure 6:
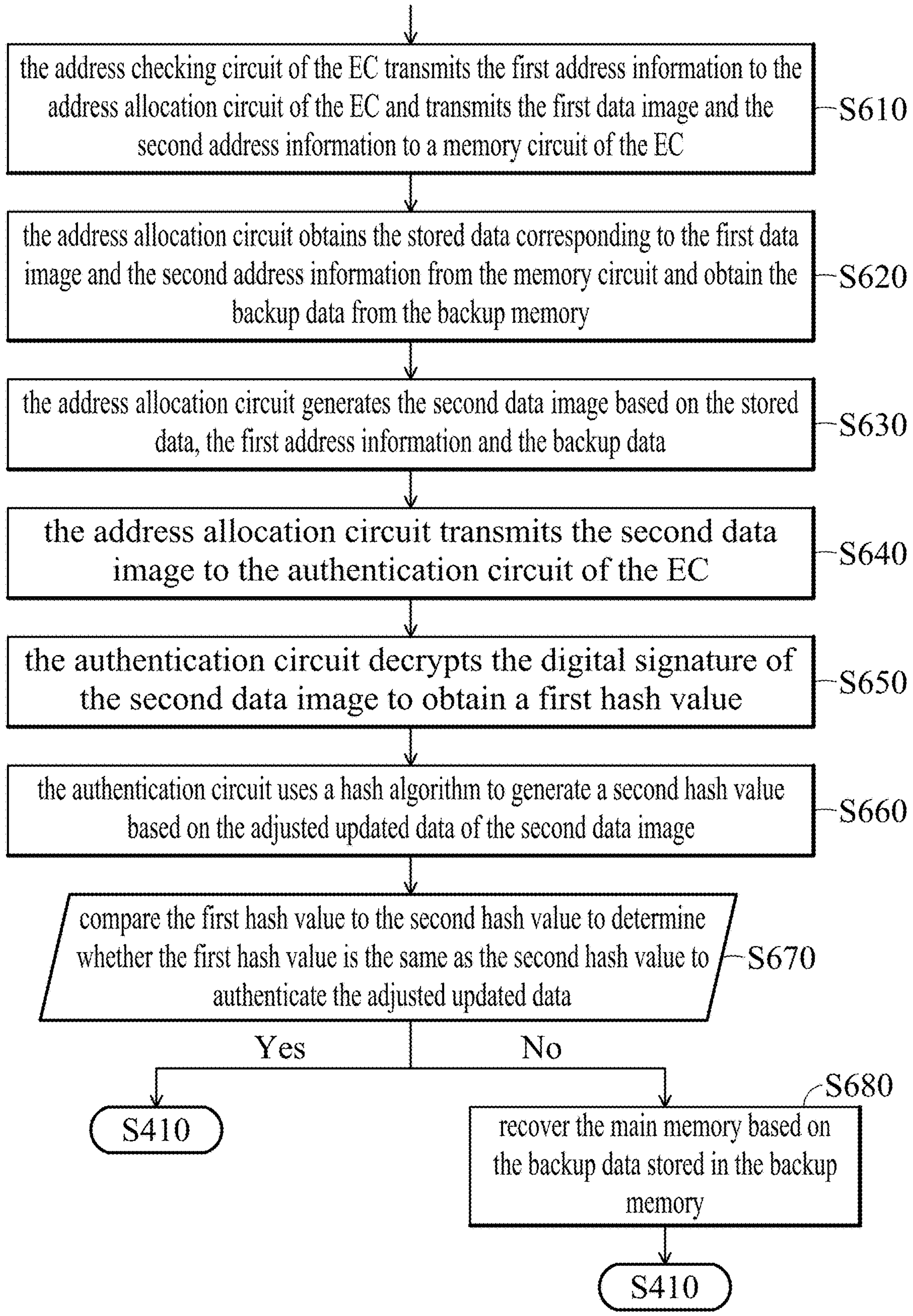
FIG. 6 is a flow chart illustrating step S450 according to an embodiment of the invention.

FIG. 6 is a flow chart illustrating step S450 according to an embodiment of the invention. The data authentication method shown in FIG. 6 can be applied to the data authentication device 100 and the EC 140 shown in FIG. 2. In step S610, the address checking circuit of the EC 140 may transmit the first address information to the address allocation circuit of the EC 140 and transmit the first data image and the second address information to a memory circuit (i.e., first memory circuit 240) of the EC 140. In the embodiment, the first address information may comprise a mapping relationship corresponded to the main memory 110 and the memory circuit, and the second address information may correspond to the memory circuit.

In step S620, the address allocation circuit of the EC 140 may obtain the stored data corresponding to the first data image and the second address information from the memory circuit and obtain the backup data from the backup memory 120 of the data authentication device 100.

In step S630, the address allocation circuit of the EC 140 may generate the second data image based on the stored data, the first address information and the backup data.

In step S640, the address allocation circuit of the EC 140 may transmit the second data image to the authentication circuit of the EC 140.

In step S650, the authentication circuit of the EC 140 may decrypt the digital signature of the second data image to obtain a first hash value.

In step S660, the authentication circuit of the EC 140 may use a hash algorithm to generate a second hash value based on the adjusted updated data of the second data image.

In step S670, the authentication circuit of the EC 140 may compare the first hash value to the second hash value to determine whether the first hash value is the same as the second hash value to authenticate the adjusted updated data.

If the first hash value is the same as the second hash value (i.e., the adjusted updated data passes the authentication), the flow may back to step S410. The EC 140 may continuously detect whether the PCH 130 generates a new write command.

If the first hash value and the second hash value are not the same (i.e., the adjusted updated data does not pass the authentication), step S680 is performed. In step S680, the EC 140 may recover the main memory 110 based on the backup data stored in the backup memory 120. Then, the flow may back to S410. The EC 140 may continuously detect whether the PCH 130 generates a new write command.

Figure 7:
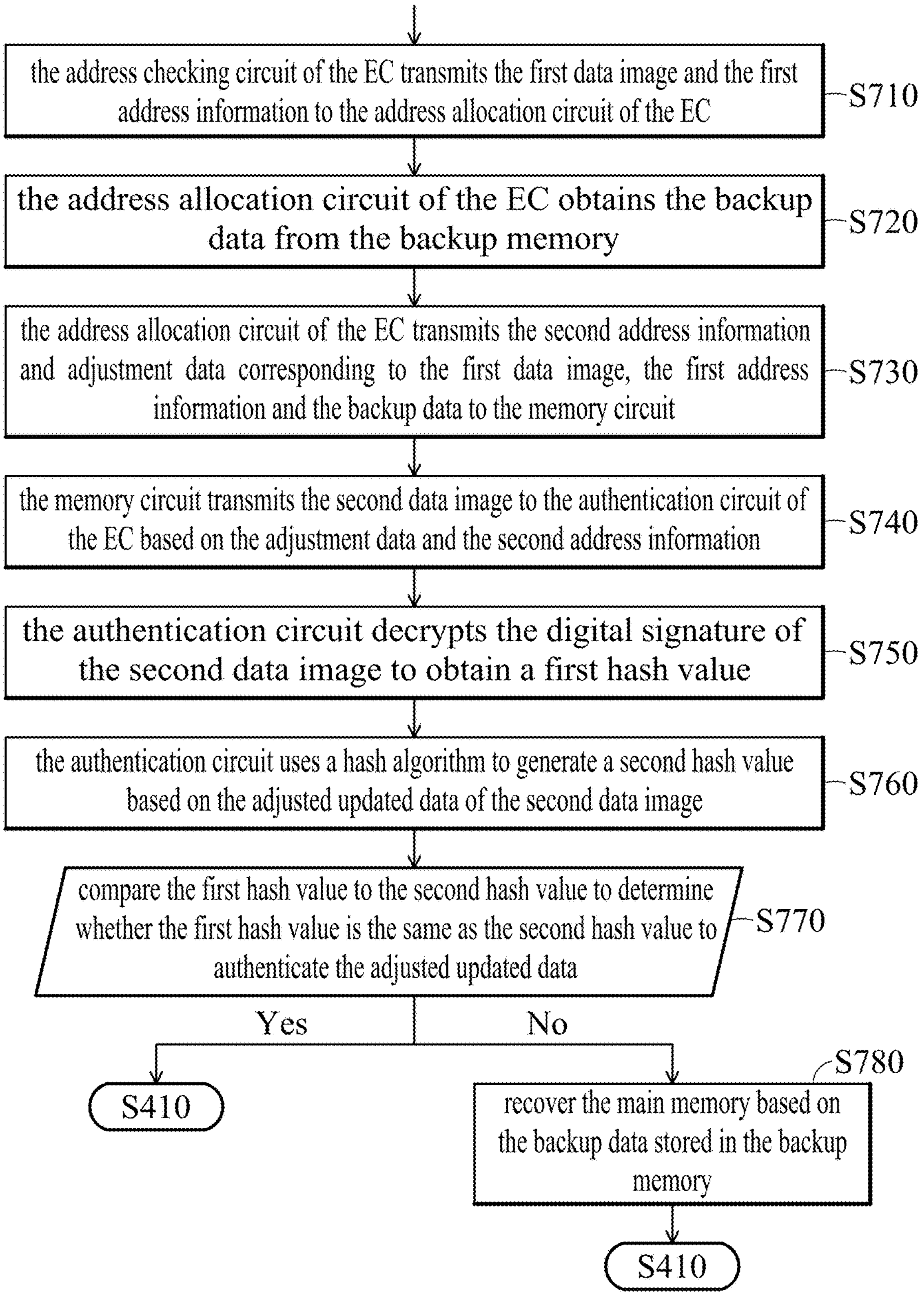
FIG. 7 is a flow chart illustrating step S450 according to another embodiment of the invention.

FIG. 7 is a flow chart illustrating step S450 according to another embodiment of the invention. The data authentication method shown in FIG. 7 can be applied to the data authentication device 100 and the EC 140 shown in FIG. 3. In step S710, the address checking circuit of the EC 140 may transmit the first data image and the first address information to the address allocation circuit of the EC 140. In the embodiment, the first address information may comprise a mapping relationship corresponded to the main memory 110 and a memory circuit (i.e., first memory circuit 340) of the EC 140.

In step S720, the address allocation circuit of the EC 140 may obtain the backup data from the backup memory 120 of the data authentication device 100.

In step S730, the address allocation circuit of the EC 140 may transmit the second address information and adjustment data corresponding to the first data image, the first address information and the backup data to the memory circuit. In the embodiment, the second address information may correspond to the memory circuit.

In step S740, the memory circuit of the EC 140 may transmit the second data image to the authentication circuit of the EC 140 based on the adjustment data and the second address information.

In step S750, the authentication circuit of the EC 140 may decrypt the digital signature of the second data image to obtain a first hash value.

In step S760, the authentication circuit of the EC 140 may use a hash algorithm to generate a second hash value based on the adjusted updated data of the second data image.

In step S770, the authentication circuit of the EC 140 may compare the first hash value to the second hash value to determine whether the first hash value is the same as the second hash value to authenticate the adjusted updated data.

If the first hash value is the same as the second hash value (i.e., the adjusted updated data passes the authentication), the flow may back to step S410. The EC 140 may continuously detect whether the PCH 130 generates a new write command.

If the first hash value and the second hash value are not the same (i.e., the adjusted updated data does not pass the authentication), step S780 is performed. In step S680, the EC 140 may recover the main memory 110 based on the backup data stored in the backup memory 120. Then, the flow may back to S410. The EC 140 may continuously detect whether the PCH 130 generates a new write command.

According to the data authentication method provided in the invention, when the PCH has started to perform, the EC still can perform authentication for the data written from the PCH to the main memory. Therefore, according to the data authentication method provided in the invention, when the PCH is performing, the EC still can provide protection for the PCH to avoid the PCH accessing the data image which has been attacked.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data authentication device, comprising:

a main memory, storing data;

a backup memory, configured to back up the data stored in the main memory;

a platform control hub (PCH), coupled to the main memory, and generating a write command to write a first data image to the main memory, wherein the first data image comprises updated data and a digital signature; and an embedded controller (EC), coupled to the main memory, the backup memory and the PCH, and obtaining the first data image from the PCH;

wherein when the EC detects the write command, the EC performs an authentication of the updated data based on the first data image or a second data image corresponding to the first data image, wherein the EC comprises:

a memory circuit;

an address checking circuit, coupled to the main memory, wherein the address checking circuit detects the write command, obtains the first data image from the PCH, and determines that the first data image is written in all address spaces of the main memory or part of address spaces of the main memory;

an address allocation circuit, coupled to the memory circuit, the address checking circuit and the backup memory, and configured to generate the second data image; and an authentication circuit, coupled to the address allocation circuit, and configured to perform the authentication of the first data image or the second data image.

2. The data authentication device of claim 1, wherein when the address checking circuit determines that the first data image is written in all address spaces of the main memory, the authentication circuit decrypts the digital signature to obtain a first hash value, and uses a hash algorithm to generate a second hash value based on the updated data, and the authentication circuit compares the first hash value to the second hash value to authenticate the updated data.

3. The data authentication device of claim 1, wherein when the address checking circuit determines that the first data image is written in part of address spaces of the main memory, the address checking circuit transmits first address information to the address allocation circuit and transmits the first data image and second address information to the memory circuit, wherein the first address information corresponds to a mapping relationship of the main memory and the memory circuit, and the second address information corresponds to the memory circuit.

4. The data authentication device of claim 3, wherein the address allocation circuit obtains stored data corresponding to the first data image and the second address information from the memory circuit and obtains backup data from the backup memory, and wherein the address allocation circuit generates the second data image based on the stored data, the first address information and the backup data, and transmits the second data image to the authentication circuit.

5. The data authentication device of claim 4, wherein the authentication circuit decrypts the digital signature of the second data image to obtain a first hash value, and uses a hash algorithm to generate a second hash value based on data of the second data image, and the authentication circuit compares the first hash value to the second hash value to authenticate the data of the second data image.

6. The data authentication device of claim 1, wherein when the address checking circuit determines that the first data image is written in part of address spaces of the main memory, the address checking circuit transmits the first data image and first address information to the address allocation circuit, wherein the first address information corresponds to a mapping relationship of the main memory and the memory circuit.

7. The data authentication device of claim 6, wherein the address allocation circuit obtains backup data from the backup memory, and based on the first data image, the first address information and the backup data, transmits second address information and adjustment data which corresponds to the first data image, the first address information, and the backup data to the memory circuit, and the memory circuit transmits the second data image to the authentication circuit based on the adjustment data and the second address information, wherein the second address information corresponds to the memory circuit.

8. The data authentication device of claim 7, wherein the authentication circuit decrypts the digital signature of the second data image to obtain a first hash value, and uses a hash algorithm to generate a second hash value based on adjusted updated data of the second data image, and the authentication circuit compares the first hash value to the second hash value to authenticate the adjusted updated data.

9. The data authentication device of claim 1, wherein when the updated data does not pass the authentication, the EC recovers the main memory based on backup data stored in the backup memory.

10. A data authentication method, applied to a data authentication device comprising a backup memory, an embedded controller (EC) and a platform control hub (PCH), the EC comprising an authentication circuit, comprising:

detecting, by the EC, whether the PCH generates a write command to write a first data image to a main memory; and when the EC detects that the PCH has generated the write command, obtaining, by the EC, the first data image from the PCH, wherein the first data image comprises updated data and a digital signature; and performing, by the EC, an authentication for the updated data based on the first data image or a second data image corresponding to the first data image, the method further comprises:

detecting, by the EC, the write command, and obtaining, by an address checking circuit, the first data image from the PCH; and determining, by the EC, that the first data image is written in all address spaces or part of address spaces of the main memory; and generating, by the EC, the second data image.

11. The data authentication method of claim 10, further comprising:

when the address checking circuit determines that the first data image is written in all address spaces of the main memory, decrypting, by the EC, the digital signature to obtain a first hash value;

using, by the EC, a hash algorithm to generate a second hash value based on the updated data; and comparing, by the EC, the first hash value to the second hash value to authenticate the updated data.

12. The data authentication method of claim 10, further comprising:

when the EC determines that the first data image is written in part of address spaces of the main memory, transmitting, by the EC, first address information to an address allocation circuit of the EC and transmitting, by the address checking circuit, the first data image and second address information to a memory circuit of the EC, wherein the first address information corresponds to a mapping relationship of the main memory and the memory circuit, and the second address information corresponds to the memory circuit.

13. The data authentication method of claim 12, further comprising:

obtaining, by the EC, stored data corresponding to the first data image and the second address information from the memory circuit and obtaining, by the EC, backup data from the backup memory;

generating, by the EC, the second data image based on the stored data, the first address information and the backup data; and transmitting, by the EC, the second data image to the authentication circuit.

14. The data authentication method of claim 13, further comprising:

decrypting, by the EC, the digital signature of the second data image to obtain a first hash value;

using, by the EC, a hash algorithm to generate a second hash value based on data of the second data image; and comparing, by the EC, the first hash value to the second hash value to authenticate the data of the second data image.

15. The data authentication method of claim 10, further comprising:

when the EC determines that the first data image is written in part of address spaces of the main memory, transmitting, by the EC, the first data image and first address information to an address allocation circuit of the EC, wherein the first address information corresponds to a mapping relationship of the main memory and a memory circuit of the EC.

16. The data authentication method of claim 15, further comprising:

obtaining, by the EC, backup data from the backup memory;

based on the first data image, the first address information and the backup data, generating, by the EC, second address information and adjustment data which corresponds to the first data image; and generating, by the EC, the second data image based on the adjustment data and the second address information.

17. The data authentication method of claim 16, further comprising:

decrypting, by the EC, the digital signature of the second data image to obtain a first hash value;

using, by the EC, a hash algorithm to generate a second hash value based on data of the second data image; and comparing, by the EC, the first hash value to the second hash value to authenticate the data of the second data image.

18. The data authentication method of claim 10, further comprising:

when the updated data does not pass the authentication, recovering the main memory based on backup data stored in the backup memory, by the EC.

* * * * *